United States Patent
O'Mara et al.

(10) Patent No.: US 6,490,568 B1
(45) Date of Patent: Dec. 3, 2002

(54) AUTOMATED SYSTEM AND METHOD FOR MONITORING FINANCIAL TRANSACTIONS

(75) Inventors: Timothy L. O'Mara, Centereach, NY (US); Margot Luna-Victoria, Woodbury, NY (US); Daniel B. Spalt, Bel Air, MD (US)

(73) Assignee: First Data Corporation, Englewood, CO (US)

( * ) Notice: Subject to any disclaimer, the term of this patent is extended or adjusted under 35 U.S.C. 154(b) by 0 days.

(21) Appl. No.: 09/474,572

(22) Filed: Dec. 29, 1999

(51) Int. Cl.$^7$ .............................................. G06F 17/60
(52) U.S. Cl. .......................................... 705/39; 705/38
(58) Field of Search ...................................... 705/38, 39

(56) References Cited

U.S. PATENT DOCUMENTS

| | | | |
|---|---|---|---|
| 5,357,563 A | * 10/1994 | Hamilton et al. ............. | 379/91 |
| 5,933,817 A | * 8/1999 | Hucal .......................... | 705/39 |
| 5,950,179 A | * 9/1999 | Buchanan et al. ............ | 705/38 |
| 6,112,190 A | * 8/2000 | Fletcher et al. ............... | 705/38 |
| 6,158,657 A | 12/2000 | Hall, III et al. | |

FOREIGN PATENT DOCUMENTS

EP        0 590 861 A2 *  9/1993       ............. G07F/7/08

OTHER PUBLICATIONS

Linda Punch, The Other Side of Credit Card Fraud, Credit Card Management, v10n6, pp: 132–134, Sep. 1997.*

* cited by examiner

Primary Examiner—Vincent Millin
Assistant Examiner—Charles R. Kyle
(74) Attorney, Agent, or Firm—Brooks & Kushman, P.C.

(57) ABSTRACT

An automated system and method which monitors the cash flow of the merchant account and maintains a minimum balance for each merchant account based upon allowable delays. The automated system/method includes a point of sale device and data files for transactional activity. The point of sale device resides at the merchant's premises and is used for commercial transactions between a credit card holder and a merchant. The data files are comprised of the net transactional activity between the credit card holder and the merchant. The system further includes a merchant credit card transaction processor for processing data files at the merchant premises and a merchant database. The system further includes a transaction processor in communication with the merchant credit card transaction processor, the merchant database and a plurality of card issuers. The transaction processor facilitates the flow of credit card transaction data by withholding a fraction of the net transactional amount based upon the transactional parameters to maintain a minimum merchant account balance. Also provided is a method for monitoring the cash flow of a merchant account and for maintaining a minimum balance for each merchant account. The method includes gathering at least one transaction performed by a merchant; adding up the amounts of the at least one transaction to determine a net amount for daily merchant account activity; allocating a fraction of the net amount to a merchant reserve account for future funding; and disbursing the net amount minus the fraction allocated to the reserve account to the merchant.

1 Claim, 2 Drawing Sheets

AUTOMATED SYSTEM AND METHOD FOR MONITORING FINANCIAL TRANSACTIONS

TECHNICAL FIELD

This invention relates to an automated system and method for monitoring financial transactions.

BACKGROUND ART

With the advent of computerized systems and the internet, commercial transactions have experienced a significant increase. Credit cards, debit cards and other financial account cards, as part of the entire process, are popular means to transact business. Accordingly, credit cards, debit cards and other cards have gained widespread acceptance as a method of paying for goods and services. These cards collectively may be referred to as "data cards." Data cards in use today typically include a magnetic stripe containing account and other information, and most often include an account number and other information in embossed or raised characters.

Two elements must be present before a credit card transaction can be completed successfully. First, the consumer or cardholder must possess a valid credit card. Second, the merchant must be authorized to accept the card as payment for the goods or services and to receive payment from the organization that issued the credit card. The card issuing organization subsequently receives payment from the cardholder.

Credit cards are issued by banks and other financial organizations, generally as members and under the regulations of a credit card issuing association or entity. VISA®, MASTERCARD®, DISCOVER CARD®, and AMERICAN EXPRESS® are examples of credit card issuing associations or entities for particular brands of data cards. When a credit card is issued, the issuer is, in effect, granting a line of credit to the cardholder. Because the issuer is granting a line of credit, a credit card will be issued only after the issuer has conducted a credit background check and is satisfied as to the cardholder's ability and willingness to repay the debts incurred. The issuer's confidence is reflected in the amount of credit granted, which may range from a few hundred dollars to tens of thousands of dollars.

Many data card transactions involve third-party credit card transaction processors in addition to the merchant and credit card issuer. Transaction processors, which are sometimes independent business institutions, provide merchants with data processing services that facilitate the flow of credit card transaction data and the corresponding payments of monies between the merchants and card issuers. The flow of transaction data from the merchant to the issuer via a transaction processor is commonly referred to as "processing" or "clearing" the transactions. The flow of money from the issuer to the merchant via a processor is known as "settlement." The term "transaction processor", as used herein, generally means a third-party institution that processes card transactions independently of a card issuer, but can also include card issuers and card issuing associations that process their own transactions.

In a typical credit card transaction, a card holder presents a credit card to a merchant, who records transaction data by using either an electronic terminal or a manually imprinted sales draft. The recorded data includes the amount of the purchase, the cardholder's account number, the card's expiration date, the merchant identification number, and the date of the transaction. In most cases, the cardholder is also required to sign a copy of the receipt.

At the end of each day, the merchant determines the total dollar volume of the credit card transactions completed and prepares a deposit slip indicating that amount. All of the transaction data is then transferred to the merchant's credit card transaction processor and entered into the transaction processor's computers. This transfer may be electronic, in which case a data capture terminal transfers the data directly to the processor's computer. Alternatively, the transfer may involve the deposit of imprinted paper sales drafts and subsequent entry of the data into the computers by the processor's data entry personnel.

Once the data is received by the transaction processor, the amount of the merchant's "deposit" is verified and recorded. At that point, the transactions are separated according to the type of credit card used to complete the transaction. The transaction processor then transfers the corresponding transaction data to the appropriate credit card issuer or card issuing association. After the data is transferred to the issuer, the issuer posts the individual transactions to the appropriate cardholder's account.

In most cases, settlement occurs very soon after the data is cleared. For example, after a transaction processor receives a merchant's daily transaction data, the balance due the merchant is calculated and paid to the merchant via check, direct deposit, or wire transfer. The transaction processor issues the check out of the individual merchant account held with the transaction processor. Transaction processors perform the task of maintaining the individual merchant accounts manually. In addition to maintaining merchant accounts, the transaction processor sorts the transaction data from all of its client merchants according to the type of card used and forwards that data to the appropriate card issuer. Because transaction processors perform these functions manually, processing and account maintenance accordingly becomes extremely time-consuming and costly.

Once the transaction processor has sorted the transactions and forwarded the information to the appropriate card issuer, the issuer or card association then determines the balance due the transaction processor and transfers that amount to the transaction processor. As a part of a transaction settlement, transaction processors and issuers assess fees for processing the credit card transaction. These fees are commonly referred to as the "discount rate" and are usually calculated as a percentage of the face value of the credit card transaction. The issuer deducts its fee as percentage from the total amount due the transaction processor.

As noted above, in performing its tasks, the transaction processor must maintain an account for each merchant. Where the merchant is a high risk, the transaction processor may require a minimum account balance or reserve. The reserve or minimum balance serves as collateral for future debits. Transaction processors must monitor the cash flow into and out of the account. Given that monitoring the accounts is performed manually, transaction processors incur great cost. Consequently, a need has developed whereby transaction processors may have an automated system and method which monitors the cash flow of the merchant account and maintains a minimum balance for each merchant account based upon allowable delays.

DISCLOSURE OF INVENTION

In view of the above problems associated with the related art, it is an object of the present invention to provide an automated system which monitors the cash flow of an account.

It is also an objective of the invention to provide a system which maintains a minimum balance for each merchant account based upon allowable delays.

In view of the above problems associated with the related art, it is an object of the present invention to provide a method which automatically monitors the cash flow of an account.

It is also an objective of the invention to provide a method which maintains a minimum balance for each merchant account.

In carrying out the above objects and other objects and features, an automated system and method for monitoring the cash flow and maintaining a minimum balance is provided. The automated system/method includes a point of sale device and data files for transactional activity. The point of sale device resides at the merchant's premises and is used for commercial transactions between a credit card holder and a merchant. The data files are comprised of the net transactional activity between the credit card holder and the merchant. The system further includes a merchant credit card transaction processor for processing data files at the merchant premises and a merchant database. The system further includes a transaction processor in communication with the merchant credit card transaction processor, the merchant database and a plurality of card issuers. The transaction processor facilitates the flow of credit card transaction data by withholding a fraction of the net transactional amount based upon the transactional parameters to maintain a minimum merchant account balance.

The above objects and other objects, features, and advantages of the present invention are more readily understood from review of the attached drawings and the accompanying specification and claims.

BEST MODE FOR CARRYING OUT THE INVENTION

Figure 1:
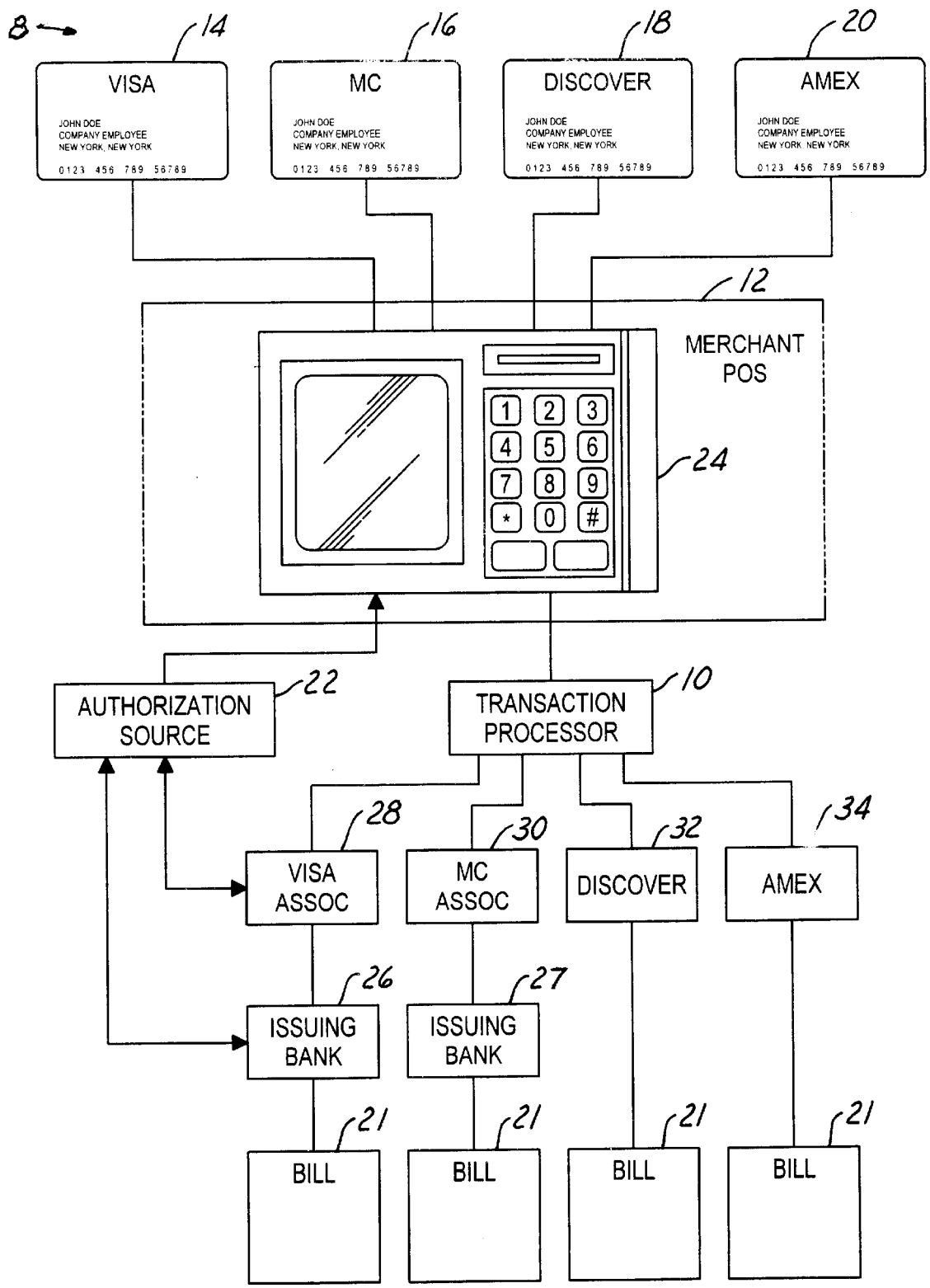
FIG. 1 consists of a flow diagram which illustrates the context of the present invention.

With reference to FIG. 1, a diagram illustrating the overall system 8 which is used to process and settle data card transactions is shown. The system contemplates that a transaction processor 10 (which is a card issuer or an independent transaction processor) is employed for transaction clearing and settlement. A merchant 12 may transfer transaction data to the transaction processor 10 electronically or in the form of paper sales drafts. The data is typically transferred from the transaction processor 10 to the credit card issuer electronically. Once the card issuer receives the data, the transactions are posted to the appropriate cardholder's account or stored for subsequent posting to the appropriate card holder's account. Settlement occurs as funds are transferred from the issuing institution to the merchant.

In a typical transaction, a cardholder proposes to purchase goods or services and presents a credit card such as one of the types 14, 16, 18, 20 shown in FIG. 1, to the merchant as the method of payment. In some cases, the merchant communicates with the transaction processor 10 as an authorization source in order to have the proposed transaction authorized prior to completing the transaction. In other cases, the merchant communicates with a separate authorization source 22 for requesting transaction authorization. Either authorization source may communicate with a card issuing association or a card issuer for authorization.

Periodically (e.g. daily), the merchant 12 transfers the data from all of the credit card transactions to the transaction processor 10 so that the transactions may be processed or "cleared." Some transactions processors 10 handle different types of credit cards, thereby obviating the merchant's 12 need to communicate separately with different card issuers. In such cases, the transaction processor 10 separates that merchant's transactions according to the type of card used. The transaction processor 10 then combines the transactions for each type of card with those received from other merchants and forwards the data to the respective card issuing association.

In the case of VISA® 28 and MASTERCARD® 30 card issuing associations, the entities that receive the data from the transaction processor comprise associations 28, 30, 32, 34 that are formed by member banks 26, 27 that actually issue the credit cards. These associations 28, 30, 32, 34 accumulate the data and send it to the individual card holder's bank. In the case of other credit card issuing associations, e.g. DISCOVER® 32 and AMERICAN EXPRESS® 34, the transaction processor 10 transmits data directly to the credit card issuing association 32, 34. In either case, once the entity that issued the credit card to the card holder receives the data, each transaction is posted to the appropriate account and a statement or bill 21 is subsequently sent to the card holder.

The present invention focuses on the internal operations of the transaction processor 10. Previously, transaction processors 10 manually processed the data received from merchants 12. Transaction processors 10 would manually gather reports from the merchants 12 and physically determine the net amount due to each merchant 12 each period. Applicant's invention has made the transaction processing more efficient by electronically automating the process and has also made transaction processing more secure for the transaction processor by creating collateral for the merchant upon which future debits may be made.

Figure 2:
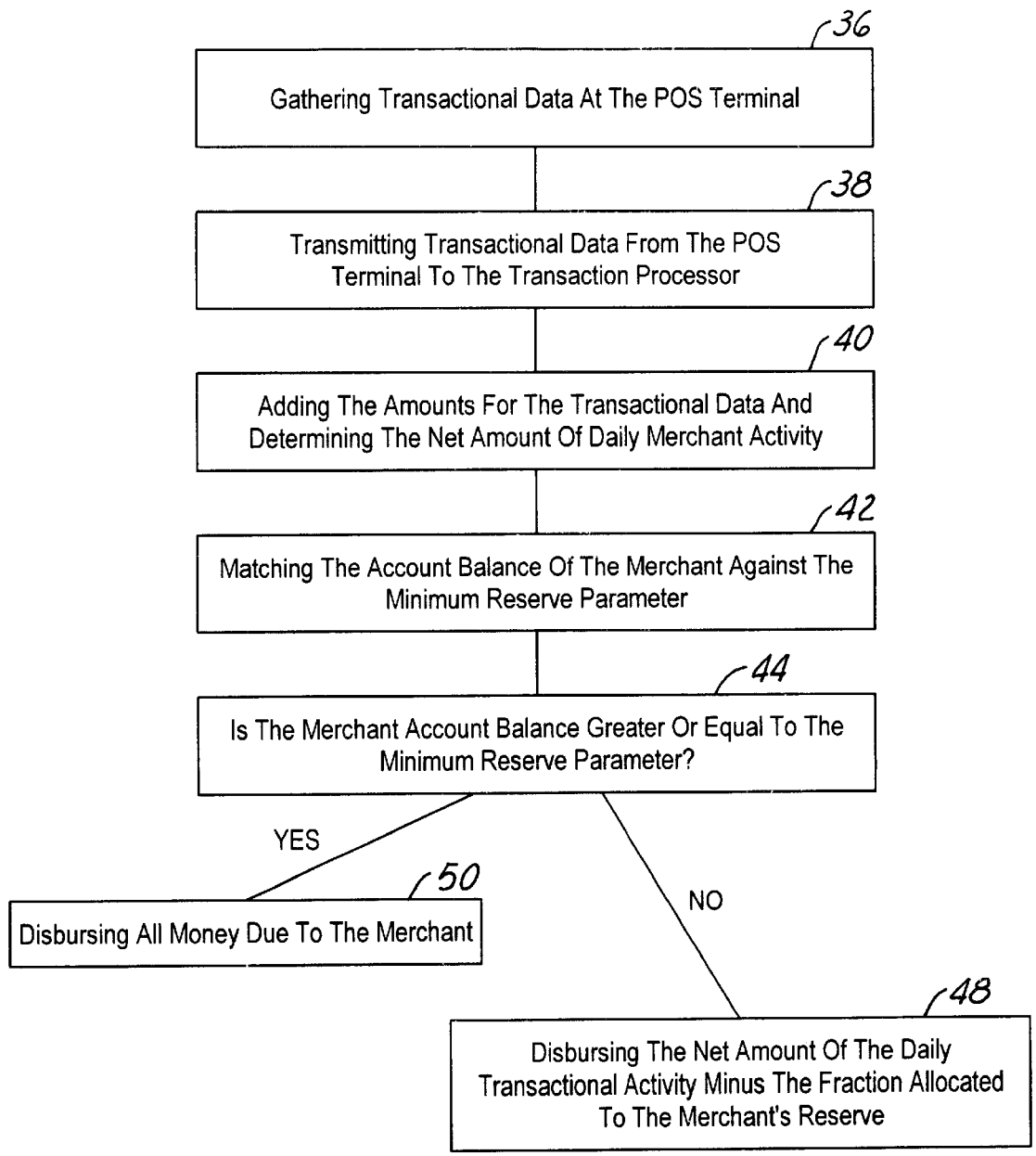
FIG. 2 consists of a flow diagram which illustrates the present invention.

FIG. 2 shows the method of the present invention as performed inside the transaction processor. In order to monitor the cash flow of a merchant account and to create and maintain a minimum balance for each merchant account, the present invention involves the following steps: gathering transactional data at a point of sale terminal 36; transmitting transactional data from the point of sale terminal to the transaction processor 38; adding up the amounts of the transactional data to determine a net amount for daily merchant account activity 40; and matching an account balance of the merchant residing at a transaction processor against a minimum reserve parameter 42. Where the account balance is less than the minimum reserve parameter 44, the system allocates a fraction of the net amount to a merchant reserve account for future funding and disburses the net amount minus the fraction allocated to the reserve account to the merchant 48. Where the account balance is greater or equal to the minimum reserve parameter 44, the system disburses all money due to the merchant 50.

Before the above method may be employed, the transaction processor and more particularly the credit officer must set five parameters for the automated system. The five key parameters include but are not limited to: (1) Delay Days; (2) Effective Date; (3) Minimum Reserve; (4) Percent; and (5) Minimum Dollar Amount.

Collateral or a minimum balance is created at the transaction processor by delaying payment to the merchant. The collateral or minimum balance serves to mitigate fraud by preventing excessive payments to the merchant and by serving as a backup means for payment. As funds come due to the merchant after the transaction processing occurs at the transaction processor, funds will be initially delayed. The funds are delayed until the minimum reserve is created. Also, only a percentage of the funds are delayed in order to avoid hardship on behalf of the merchant. The percentage of funds delayed and the number of days the funds will be delayed is set by at the Credit Officer Decision Screen which resides at the transaction processor or at a Suspense Screen which also resides within the transaction processor.

The number of delay days may have a possible value from 1 to 99. The default may be zero. By inputting a number of delay days into this field, the system will delay the funding of a merchant's daily deposits, credits and deposit-related fees for the number of days specified in this field. However, this field cannot have a value less than the value for ACH delay days. With respect to the effective date, this is a field which tells a system when the delay days should take effect. The minimum reserve allows the transaction processor to enter an adjusted minimum reserve balance. The credit officer of the transaction processor will manually input a dollar value in this field. The field typically will default to zero. The system will not release any delayed funds until the dollar amount indicated here is attained. The system will determine whether the minimum reserve has been attained by comparing the value in minimum reserve to the settlement account balance.

The percent field is also a field in which data must be manually entered. The default for this field typically would be 100%. The analyst will manually input a value in this field to delay only a portion of the merchant's funds during the initial RPP setup period until the minimum reserve is established. Once the minimum reserve is established and the delay days have passed, this field will automatically reset to 100%.

The field for the dollar amount constitutes the amount which must be delayed at a minimum. However, once the minimum reserve is established and the delay days have passed, this field will automatically reset to zero. An example of the functionality for the above parameters is shown in the following example. For example, the merchant's number of delay days may be changed to 15. For ten days following the change, the merchant will be funded as if he was still on a ten day revolving schedule. On the eleventh day, after the change to the delay day's field was made, the merchant will begin a five day period where he will not be funded. Finally, on the 16th day after the change was made, the merchant will be funded his deposits which were made 15 days earlier (according to the new 15 day delay schedule).

In another example, a merchant's number of delay days is changed to five. For five days following the change, the merchant will be funded as if he were still on the ten day revolving schedule. On the sixth day after the change to the delay days field was made, the merchant will begin a five day period where he will have an overlap of funding (for deposits made during the five days prior to the change, and the deposits made five days following the changes). Finally, on day 11 after the change was made, the merchant will be funded his deposits which were made five days earlier (according to the new five day delay schedule).

This system has the ability to delay a percentage of the merchant's daily deposits during the initial setup period while building the required minimum reserve. The percentage will be applied to the merchant's net daily deposits, which should be calculated from the daily sales less the daily credits and discounts and other deposit related fees. The remaining percent of funds will automatically get funded to the merchant after netting out any other debits for that day (including charge backs and non-deposit related fees). This requirement needs to take into account the appropriate pay cycle and role of transaction to effect this netting. Once the minimum reserve is attained and the daily days have passed, this percent field will turn off (i.e. 100% of new daily deposits will be subject to delay days).

The system has an ability to specify a required minimum dollar amount to override the percentage of funds. If the specified percentage of deposits to be withheld is less than the required minimum dollar amount, then the required dollar amount will be withheld. For example, an analyst may choose to delay 40% of a merchant's deposits as long as 40% is not less than the required minimum amount of $1,000. On day one, a merchant deposits $5,000. The merchant gets funded $3,000 of that, while $2,000 or 40% is delayed. On day two, his daily deposit is $2,000. The system will withhold $1,000 (applying the minimum amount override) and fund the remaining $1,000. Finally, on day three, the merchant deposits $900. This entire batch would be withheld (once again, applying the minimum amount override).

As previously noted, the minimum reserve balance is established from the delayed deposits. The system compares the settlement account balance to the minimum reserve amount to determine the achievement of this reserve. Under this system, the minimum reserve balance must be obtained prior to the scheduled release of any funds regardless of delay days have passed. When funding finally commences, the merchant will be funded deposits from "N" days ago. (where "N" equals a number of delay days). Any deposits which were withheld prior to that date will be held indefinitely and considered a contribution to building up the initial reserve. However, if the minimum balance is achieved daily, the funds must be delayed until the specified number of delay days have passed.

For example, if delay days is set at five and the minimum reserve is $10,000, the following scenarios may result:

If $10,000 is achieved on the day three, then continue to delay funding until five days have passed. In this case, the "delay days" field overrides the "minimum reserve" field. The funding delay may result in a reserve balance which exceeds the required minimum.

If five days have passed and the attained reserve is $7,500, then continue to delay funding until $10,000 is achieved. In this case, the "minimum reserve" field overrides the "delay days" field. Further, if $10,000 was obtained on day eight, then on day nine begin funding the deposits which came in on day four (i.e., five days earlier). The deposits from day one, two and three will remain suspended as part of the $10,000 reserve.

When the minimum reserve is reached and the delay days have passed, the system should automatically reset the "percent" field to 100% and the "minimum dollar amount" field to zero. If the release of a particular day's funds will result in total reserve falling below the minimum reserve, then the system should automatically suspend that day's funding by halting is scheduled release. If the reserve amount ever falls below the required minimum reserve, then the system should automatically suspend funding until the minimum reserve is reestablished via daily deposits.

As noted above, the system will automatically release daily deposits (after funding delay days are achieved) using a first-in first-out approach where the oldest deposits go out first. Released funds will be subject to subtraction of current chargebacks or fees, and to the maintenance of the minimum reserve.

While initially building up the target reserve balance, current chargebacks are deducted and non-deposit related fees are deducted from the balance of the daily deposits that get funded to the merchant (i.e., after the percent has been deducted and withheld for the reserve). If there is a net debit amount on any given day, the debit is forwarded to the merchant's DDA through the normal funding process. Once the number of delay days and minimum reserve requirements are met, and daily funding of historical deposits has commenced, then incoming chargebacks and other debits (including non-deposit related fees) are offset against that day's funding. If there is a net debit amount on any given day, forward the debit to the merchant's DDA through the normal funding process.

Where the total amount suspended during the delay period ever becomes a negative amount, then the system must immediately override the delay days and send the debit to the merchant through the normal funding process.

Deposits are retained in a settlement account which functions as a dynamic funding queue. The settlement account will be separate from the reserves. The funding area will not be able to touch the settlement account to resolve negative settlement issues. However, the collections area will be able to use the settlement account to resolve collection balances.

This system is also capable of cooperating with other risk management programs to allow the risk management programs to selectively divert and approve a specific dollar amount of a merchant's suspended deposits on an ad hoc basis upon reviewing the status of the transaction processor database.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for automatically monitoring the cash flow of a merchant account and for automatically maintaining a minimum balance of the merchant account, the system comprising:

a point of sale device for gathering transactional data indicative of a cash amount of each transaction between the merchant and credit card holders; and a transaction processor operable for storing the merchant account balance and variable transactional parameters of the merchant account, the transaction processor further operable for receiving the transactional data from the point of sale device in order to clear the merchant account in accordance with the variable transactional parameters, wherein the transaction processor adds up the cash amounts of the transactions from the transactional data to determine a net cash amount due the merchant and compares the merchant account balance against a merchant account minimum balance, wherein the transaction processor allocates a fraction of the net cash amount to the merchant account if the merchant account balance is less than the merchant account minimum balance and then disburses the net cash amount minus the allocated fraction of the net cash amount to the merchant, wherein the transaction processor disburses the entire net cash amount to the merchant if the merchant account balance is more than the merchant account minimum balance;

wherein the variable transactional parameters include a first field for setting the number of days the transaction processor can delay disbursing the net cash amount minus the allocated fraction of the net cash amount to the merchant if the merchant account balance is less than the merchant account minimum balance, a second field for setting the effective date in which the first field shall be applied by the transaction processor, a third field for setting the merchant account minimum balance, a fourth field for setting the fraction of the net cash amount to be allocated to the merchant account if the merchant account balance is less than the merchant account minimum balance, and a fifth field for setting a minimum portion of the net cash amount to be allocated to the merchant account until the merchant account balance has reached the merchant account minimum balance.

* * * * *